J. HESSE.
SEED CORN DRIER.
APPLICATION FILED AUG. 21, 1916.
1,228,556.
Patented June 5, 1917.
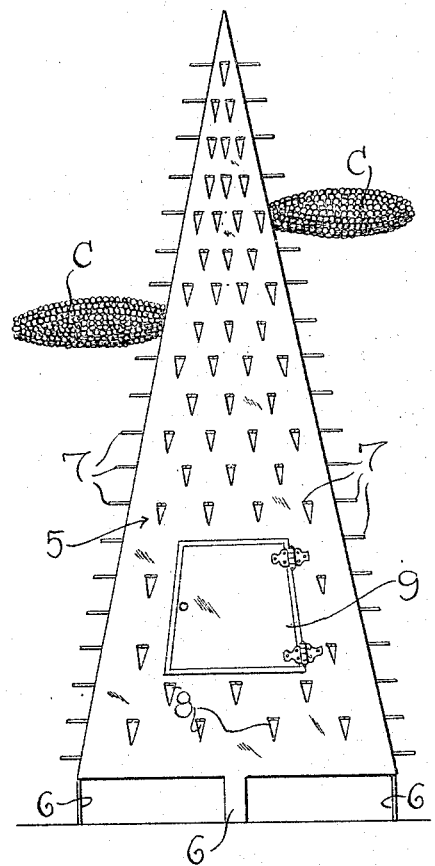
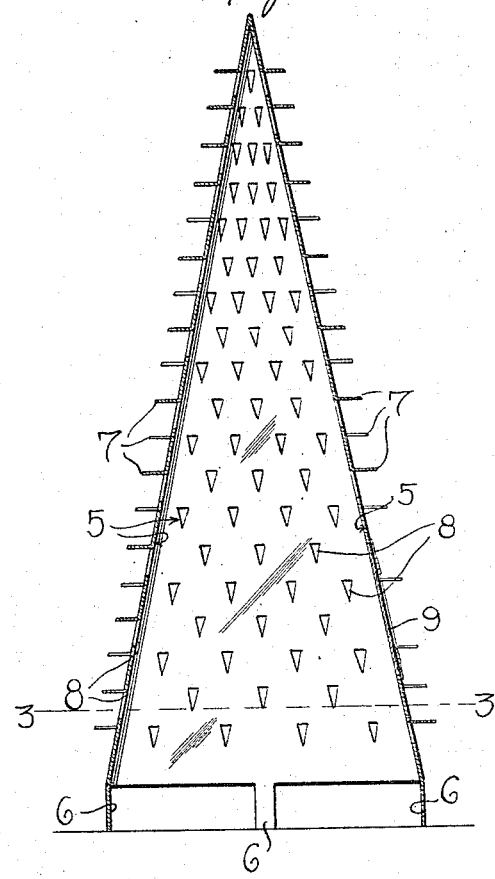
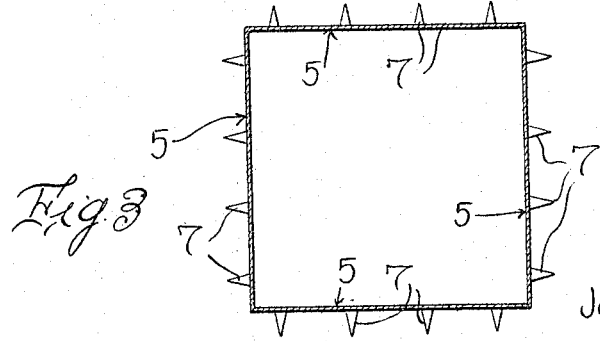
Inventor
JOSEPH HESSE
By Watson E. Coleman
Attorney

UNITED STATES PATENT OFFICE.

JOSEPH HESSE, OF HARTINGTON, NEBRASKA.

SEED-CORN DRIER.

1,228,556.  Specification of Letters Patent.  Patented June 5, 1917.

Application filed August 21, 1916. Serial No. 116,108.

*To all whom it may concern:*

Be it known that I, JOSEPH HESSE, a citizen of the United States, residing at Hartington, in the county of Cedar and State of Nebraska, have invented certain new and useful Improvements in Seed-Corn Driers, of which the following is a specification, reference being had to the accompanying drawings.

This invention relates to an improved seed corn drier, and has for its primary object to provide a simple and durably constructed device for supporting a multiplicity of ears of corn in proximity to heated air currents so that the corn may be quickly dried.

It is a more particular object of the invention to provide a device for the above purpose embodying a pyramidal-shaped, hollow support, the side walls of which are provided with means to receive and support the ears of corn, said body walls having openings immediately below each of the supporting means through which air heated by a lamp or other convenient medium arranged in the lower end of the hollow body, issues.

It is a further general object of my invention to provide a seed corn drier which is of great convenience and serviceability in practical use and may be manufactured at relatively small cost.

With the above and other objects in view, my invention consists in the novel features of construction, combination and arrangement of parts to be hereinafter more fully described, claimed and illustrated in the accompanying drawing, in which, Figure 1 is a side elevation of a seed corn drier constructed in accordance with the preferred embodiment of my invention;

Fig. 2 is a vertical sectional view; and

Fig. 3 is a section taken on the line 3—3 of Fig. 2.

Referring in detail to the drawing, 5 designates the upwardly tapering or converging side walls of the pyramidal-shaped body. This body is constructed of sheet metal and is preferably of rectangular form in horizontal section. The lower end of the body 5 is open, and upon the lower edges of its side walls depending supporting legs 6 are formed to support the body structure above and in spaced relation to the floor or ground.

A plurality of spaced, V-shaped incisions are cut in each of the side walls of the sheet metal body 4 and the metal struck outwardly at right angles to the walls to provide the V-shaped spurs or teeth 7 and a correspondingly shaped opening 8 immediately below each of said spurs. The ears of corn, indicated at C, are adapted to be engaged upon said spurs by forcing the butt ends of the corn ears against the spur points, causing the latter to penetrate the cob. These spurs 7 are so spaced that the corn ears will not contact with each other, but there will be a slight space between the same.

In one of the side walls of the pyramidal-shaped body 5, adjacent its lower end, a door 9 is mounted for convenience in lighting a lamp or other heating means which is disposed within the lower open end of said body.

In the use of the device, after the ears of corn have been engaged upon the spurs 7 in the manner above stated, the heated air rising through the interior of the body passes outwardly through the openings 8 and contacts with the spaced ears of corn. The corn is thus very quickly dried and the ears then removed and replaced by others. It will be understood that the device may, if desired, be employed without the heating medium, as there is a free circulation of air upwardly through the pyramidal-shaped body and the openings 8. By constructing the body in the form illustrated, the corn ears may be removed from one of the side walls without danger of the device being overbalanced by the weight of the remaining ears of corn. It is manifest that the corn rack or drier can be constructed in various sizes and of tin, sheet iron or other suitable sheet metal.

From the foregoing description, taken in connection with the accompanying drawing, it will be seen that I have produced a very simple and convenient device for drying seed corn, and one which may be manufactured at comparatively small cost. The corn ears may be very easily and quickly mounted and positioned upon the walls of the drier or removed therefrom.

While I have shown and described the preferred construction and arrangement of the several features of the device, it is to be understood that the same are susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. A seed corn drier comprising a pyramidal-shaped body open at its lower end, each of the side walls of said body being provided with a multiplicity of spaced, outwardly projecting spurs to receive the corn ears, and a ventilating opening immediately below each of said spurs.

2. A seed corn drier comprising a pyramidal-shaped, sheet metal body open at its lower end, each of the side walls of the body having a multiplicity of V-shaped incisions cut therein and the metal struck outwardly at right angles to the body wall to provide V-shaped spurs to receive the corn ears, and a ventilating opening immediately below each of said spurs.

3. A seed corn drier comprising a pyramidal-shaped, sheet metal body open at its lower end, each of the side walls of the body having a multiplicity of V-shaped incisions cut therein and the metal struck outwardly at right angles to the body wall to provide V-shaped spurs to receive the corn ears, a ventilating opening immediately below each of said spurs, a plurality of supporting legs on the lower edge of each of the side walls to support the open lower end of the body above the floor, and a door in one of the side walls to afford access to the interior thereof for the ignition of a suitable air heating means.

4. A seed corn drier comprising a sheet metal body open at its lower end and provided with supports to space said open end of the body from the ground, each of the side walls of the body having outwardly struck spurs projecting at right angles to the wall and providing a ventilating opening immediately below each spur.

5. A seed corn drier comprising a sheet metal body open at its lower end and having upwardly converging side walls, each of said side walls being provided with a plurality of integral, outwardly projecting, corn ear supports and a ventilating opening immediately beneath each of said supports.

In testimony whereof I hereunto affix my signature in the presence of two witnesses.

JOSEPH HESSE.

Witnesses:
JOSEPH FERNHOLZ,
WILLIAM RAMEIL.

Copies of this patent may be obtained for five cents each, by addressing the "Commissioner of Patents, Washington, D. C."